(12) United States Patent
Champion et al.

(10) Patent No.: US 7,426,651 B2
(45) Date of Patent: Sep. 16, 2008

(54) SYSTEM AND METHOD FOR ENCODING INDEPENDENT CLOCK USING COMMUNICATION SYSTEM REFERENCE CLOCK

(75) Inventors: Mark Champion, Kenmore, WA (US); Robert Allan Unger, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 774 days.

(21) Appl. No.: 10/893,819

(22) Filed: Jul. 19, 2004

(65) Prior Publication Data

US 2006/0012711 A1    Jan. 19, 2006

(51) Int. Cl.
*G06F 1/04* (2006.01)
(52) U.S. Cl. .................. 713/501; 713/502; 713/600
(58) Field of Classification Search .................. 713/400, 713/500, 501–503, 600
See application file for complete search history.

(56) References Cited

U.S. PATENT DOCUMENTS

| | | | |
|---|---|---|---|
| 4,893,271 A * | 1/1990 | Davis et al. .................. 713/501 |
| 5,404,170 A | 4/1995 | Keating ...................... 348/443 |
| 5,861,879 A | 1/1999 | Shimizu et al. .............. 345/213 |
| 5,963,154 A | 10/1999 | Wise et al. .................... 341/67 |
| 5,984,512 A | 11/1999 | Jones et al. ........... 364/999.999 |
| 6,108,046 A | 8/2000 | Wu et al. ..................... 348/558 |
| 6,177,922 B1 | 1/2001 | Schiefer et al. ............. 345/132 |
| 6,217,234 B1 | 4/2001 | Dewar et al. ........... 395/200.77 |
| 6,230,270 B1 * | 5/2001 | Laczko, Sr. .................. 726/34 |
| 6,285,404 B1 | 9/2001 | Frank .......................... 348/469 |
| 6,359,910 B1 | 3/2002 | Takahashi .................... 370/535 |
| 6,369,855 B1 | 4/2002 | Chauvel et al. .......... 348/423.1 |
| 6,396,545 B1 | 5/2002 | O'Donnell ................... 348/537 |
| 6,522,365 B1 | 2/2003 | Levantovsky et al. ....... 348/537 |
| 6,567,986 B2 | 5/2003 | Ward et al. ................... 348/101 |
| 6,686,803 B1 * | 2/2004 | Perrott et al. .................. 331/10 |
| 7,088,398 B1 * | 8/2006 | Wolf et al. ............... 348/423.1 |
| 2004/0095468 A1 | 5/2004 | Overton ....................... 348/180 |
| 2005/0286670 A1 * | 12/2005 | Jungerman ................... 375/371 |
| 2007/0058078 A1 * | 3/2007 | Champion .................. 348/513 |

* cited by examiner

*Primary Examiner*—Dennis M Butler
(74) *Attorney, Agent, or Firm*—John L. Rogitz

(57) ABSTRACT

A value representing a clock, such as a video clock, that is independent of the clock of a communication system, is encoded using the communication system clock and then sent with the video for subsequent recovery by a receiver. In particular, during an interval defined by the communication system clock, the number of video clock cycles is counted and sent to the receiver. The receiver recovers the video clock using the number of video clock cycles and the communication system clock.

6 Claims, 2 Drawing Sheets

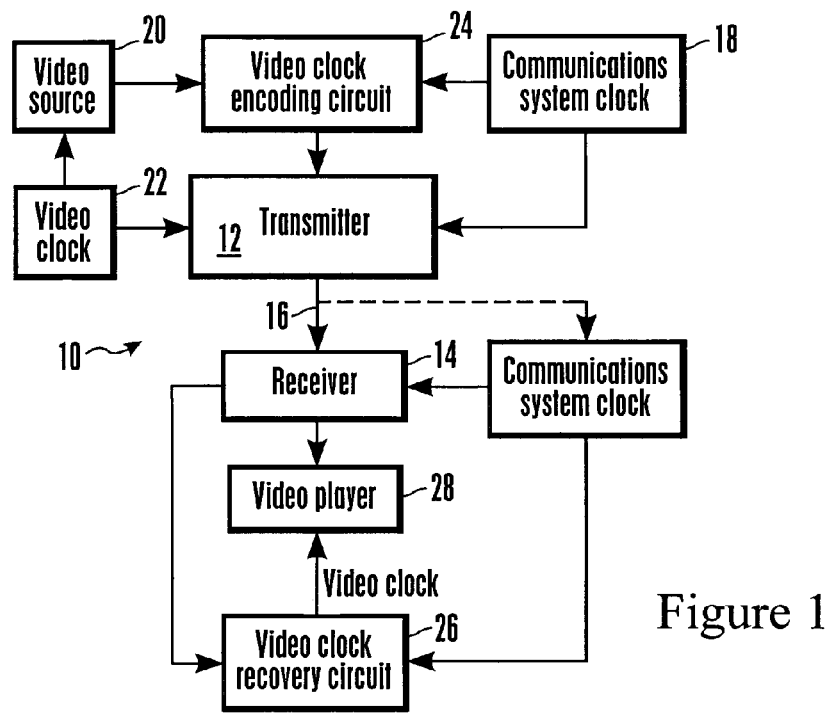
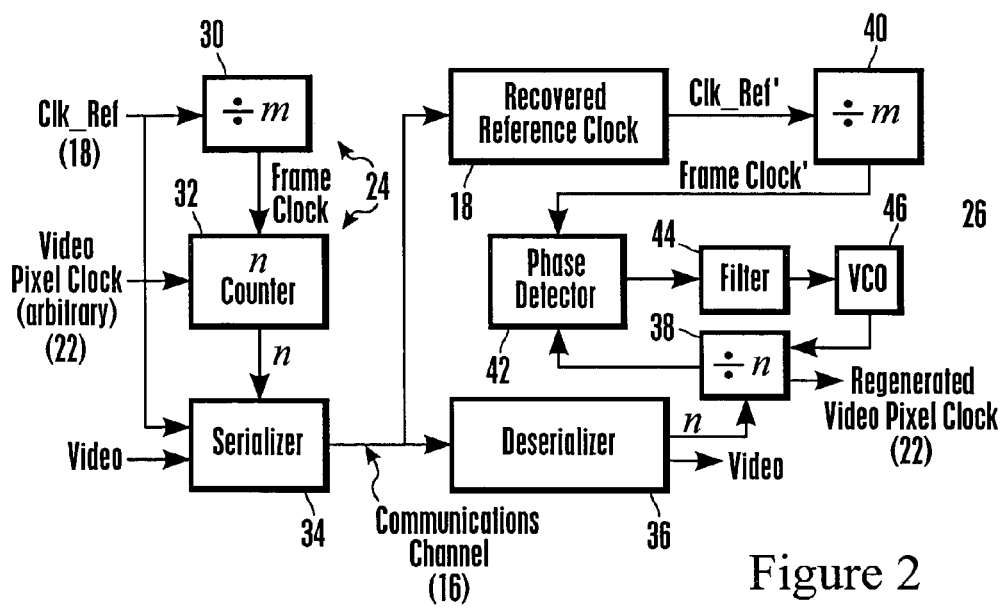
Figure 1
Figure 2

SYSTEM AND METHOD FOR ENCODING INDEPENDENT CLOCK USING COMMUNICATION SYSTEM REFERENCE CLOCK

FIELD OF THE INVENTION

The present invention relates generally to computer clocks and more particularly to encoding an independent clock such as a video (pixel) clock using a communication system clock.

BACKGROUND

Video including high definition (HD) video may be transmitted over wired paths and/or wireless paths. For instance, HD video may be transmitted over wireless digital visual interface (DVI) paths from a source to a player.

Regardless of how transmitted, the use of two clocks may be required when the video clock rate is different from the communication clock rate. The video clock refers to the rate at which the video data is encoded at a source and then decoded at a display, and the communication system clock refers to the clock rate of the transmission system. The source of video and the player of the video must use the same video clock, and similarly the transmitter and receiver of the communication system must use the same communication system clock.

How to ensure that the transmitter and receiver in a communication system use the same clock is well known and will not be further dwelt on. The transmission of data such as digital video data that moves to the beat of a different clock, however, is a relatively new technical challenge.

Heretofore, some video communication paradigms simply required the video clock to be related in some predefined way to the communication system clock. This way, there is no need to transmit any information about the video clock with the data, since the receiver system knows the predefined relationship the video clock has with the communication clock and can simply derive the video clock from the communication clock, for passing the video clock information on to the video player that requires it. Unfortunately, the requirement that the clock of the video system bear a predefined relationship to the clock of the communication system unnecessarily constrains the video system, and/or renders some video systems, which have video clocks that are established independently and arbitrarily from any communication system clock, unsuitable for transmission over the communication system. The present invention is directed to this observation, and more generally to the problem of transmitting data that uses a clock which is independent of the transmission system reference clock.

SUMMARY OF THE INVENTION

A method is disclosed for communicating a value representing a first clock over a communication system associated with a second clock. The first clock may be, without limitation, a video pixel clock associated with HD video and the second clock may be a reference clock that is established by a communication system. The first clock is not constrained to have any particular relationship with the second clock.

The method includes establishing a count period based on the second clock, and during the count period, counting a number of cycles of the first clock. The number is transmitted. At the receiving end, the number and the count period (that, recall, is based on the second clock) are used to recover the first clock.

In non-limiting embodiments the method may include executing the counting act every count period, or substantially every count period. In some embodiments the act of recovering can include using a phase detector that receives the second clock (or a clock with a period based on the second clock) and that provides input to a voltage controlled oscillator (VCO), with the VCO outputting a reconstituted version of the first clock.

In another aspect, a system for encoding a value representing a first clock for communication thereof over a communication system associated with a second clock includes means for establishing a count period based on the second clock. The system also includes means for, during the count period, counting a number of cycles of the first clock. The number is provided for transmission to a receiver.

In yet another aspect, a system for recovering a first clock that is unrelated to a second clock includes means for receiving data associated with the first clock over a communication system associated with the second clock. The system also includes means for receiving a number that represents clock cycles of the first clock during a period defined by the second clock. Means are provided for using at least the number and the second clock to recover the first clock.

In still another aspect, a video transmission system has a reference clock and a counter that counts cycles of a video clock during a period established based on the reference clock. A transmitter transmits data in accordance with the reference clock. The transmitter transmits the number with a video stream associated with the video clock.

In another aspect, a video receiving system includes a video clock regenerating circuit receiving a number representing a count of cycles of a video clock during a period based on a reference clock and known to the circuit, the circuit using the number and period to regenerate the video clock.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is block diagram of the present system;
FIG. 2 is a block diagram of the video clock encoding and recovery circuit.

DETAILED DESCRIPTION OF THE PREFERRED EMBODIMENT

Figure 3:
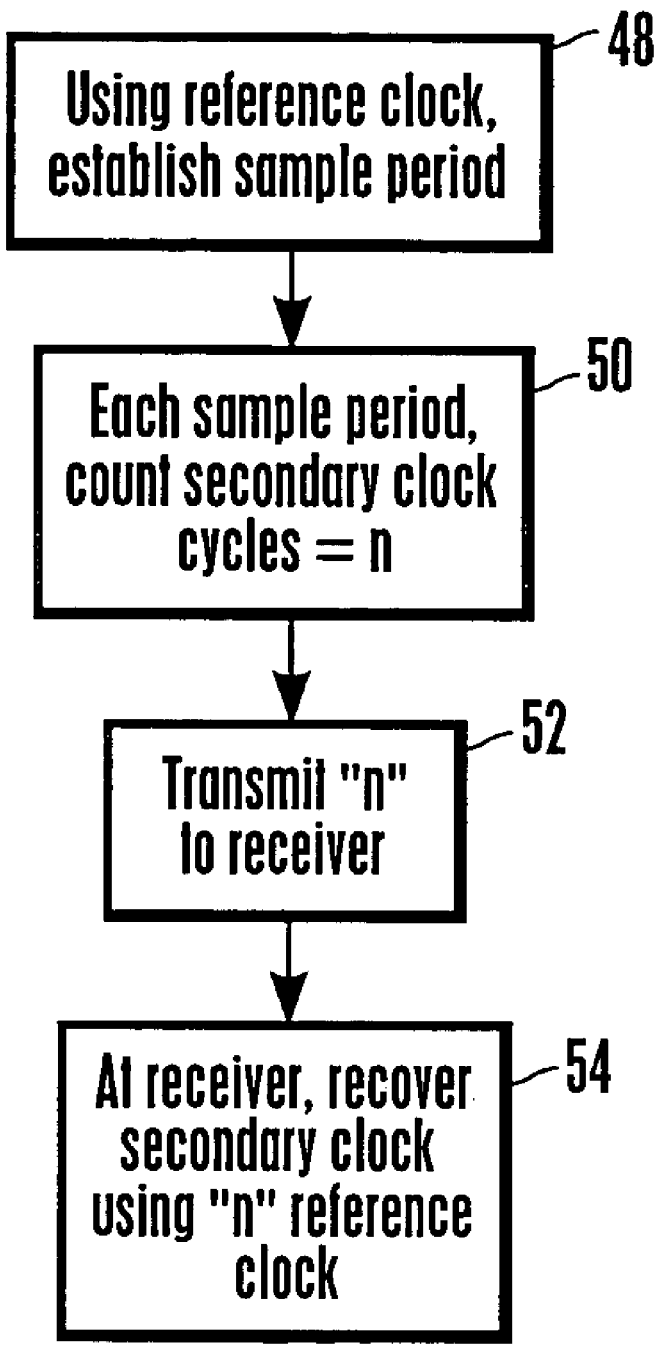
FIG. 3 is a flow chart showing the present logic.

Referring initially to FIG. 1, a system is shown, generally designated 10, that includes a transmitter 12 communicating with a receiver 14 along a communication path 16. While present principles can be applied to convey an arbitrary clock using a reference clock across any communication path, in one non-limiting embodiment the transmitter 12 sends high definition (HD) video to the receiver 14 across a wireless transmission path 16 using, e.g., wireless digital visual interface (DVI) communication principles.

The transmitter 12 and receiver 14 both receive input from a communication system clock 18, shown as two blocks in FIG. 1, it being understood that in practice the communication clock 18 may be recovered by the receiver from the transmitted signal. Thus, the communication clock 18 is a reference clock for the system, and is known to both transmitter 12 and receiver 14.

Using the communication clock 18, the transmitter 12 can transmit video from a video source 20. The video source 20 may be any source of video such as, e.g., a digital video disk (DVD) player, satellite receiver, etc. In accordance with principles known in the art, the video from the source 20 is encoded using a video clock 22, which can be output from the source as shown for purposes to be shortly disclosed. As envisioned herein, the video clock 22 need not bear any predefined relationship to the communication clock 18, and the receiver 14 need not know the video clock a priori, but rather can recover the video clock using the communication clock 18 in accordance with disclosure below. As set forth further below, this is facilitated by a video clock encoding circuit 24, which receives input from the video clock 22 and communication clock 18 and which sends an output to the transmitter 12 for transmission thereof to the receiver 14. The video clock is recovered at the receiver end by a video clock recovery circuit 26, which receives input from the communication clock 18 and which provides, as output, the video clock to a device requiring knowledge of the video clock, e.g., a display device 28 such as but not limited to a HDTV.

FIG. 2 shows a non-limiting exemplary implementation of the video clock encoding circuit 24 and video clock recovery circuit 26. As shown, in the video clock encoding circuit 24 the communication (reference) clock 18 is used to establish a frame period. More particularly, the communication clock 18 may be input to a dividing element 30 which divides the clock by an integer "m" to obtain a frame period, also referred to as a "frame clock", that is thus some fraction of the communication clock period. The integer "m" may be one, but may be between 200 and 2000. Whatever its value, "m" is constant and is known to both the video clock encoding circuit 24 and video clock recovery circuit 26.

As shown in FIG. 2, every frame period, i.e., for each frame clock cycle, a counter 32 which receives both the frame clock and video clock 22 as inputs counts the number of video clock cycles. This number is represented in FIG. 2 by the integer "n", and is the number of the video clock cycles within the frame period. The number of video clock cycles "n" is then sent to a serializer 34, which also serializes the input video stream for transmission. Accordingly, in the embodiment shown in FIG. 2, every communication (reference) clock pulse results in "m" frame periods being generated for sampling, and every frame period the number of video clock cycles is counted and output to the serializer 34. The serializer 34 may then multiplex the "n" values into the serialized video stream that is transmitted. Thus, consecutive "n" values can be separated from each other in the transmitted signal by video stream elements.

With respect to the video clock recovery circuit 26, a deserializer 36 deserializes the video stream and separates the transmitted "n" values, sending each received "n" value to an n-dividing element 38, which divides by "n". Also, from the received signal the communication system (reference) clock is recovered as indicated at the right most reference numeral 18, and is sent to an m-dividing element 40, which divides the communication clock by "m" to render the frame period.

In the non-limiting embodiment shown in FIG. 2, the outputs of the dividing elements 38, 40 of the video clock recovery circuit 26 are input to a phase detector 42. The phase detector 42 determines the phase differences between the inputs and provides an output to a filter 44. In turn, the filter 44 filters the output of the phase detector 42 in accordance with phase-locked loop filtering principles known in the art to provide a filtered input to a voltage controlled oscillator (VCO) 46. The output of the VCO 46 is divided by the continuously updated "n" value to render the recovered video (pixel) clock, for use by the display device 28 shown in FIG. 1. Thus, the video clock used by the display device 28 is continuously updated using the above principles.

While FIG. 2 shows that the present logic may be implemented in hardware, in some embodiments it may be implemented in software that can be stored on program memory and executed by a computer. Regardless of how implemented, FIG. 3 shows that the general logic may commence at block 48, wherein the above-mentioned frame period, which more generally may be regarded as a sample period, is established using the communication system (reference) clock 18. Proceeding to block 50, each sample period the number of secondary clock pulses, e.g., the number "n" of video clock pulses, is counted, and at block 52 the number "n" is transmitted. As indicated at block 54, on the receiving end the secondary clock is recovered using the "n" value and the reference clock (used to recover the frame or sample period).

Synchronization techniques known in the art can be used to avoid metastability, i.e., to select which video clock value to pick in the event that a choice must be made at a boundary between consecutive and differing values.

While the particular SYSTEM AND METHOD FOR ENCODING INDEPENDENT CLOCK USING COMMUNICATION SYSTEM REFERENCE CLOCK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for communicating a value representing a video clock over a communication system associated with a communication system clock, comprising:

establishing a count period based on the communication system clock;

during the count period, counting a number of cycles of the video clock;

transmitting the number; and recovering the video clock using the number and the count period based on the communication system clock.

2. The method of claim 1, comprising executing the counting act every count period.

3. The method of claim 1, comprising executing the counting act substantially every count period.

4. The method of claim 1, wherein the video clock is associated with high definition video.

5. The method of claim 1, wherein the video clock is not constrained to have a predefined relationship with the communication system clock.

6. The method of claim 1, wherein the act of recovering includes using a phase detector receiving the communication system clock or a derivative thereof and providing input to a voltage controlled oscillatror (VCO), the VCO outputting a signal representative of the video clock.

* * * * *